(12) United States Patent
Lee et al.

(10) Patent No.: US 12,319,352 B2
(45) Date of Patent: Jun. 3, 2025

(54) VEHICLE BODY REAR CONNECTION STRUCTURE

(71) Applicants: Hyundai Motor Company, Seoul (KR); Kia Corporation, Seoul (KR)

(72) Inventors: HaeHoon Lee, Seoul (KR); Jungho Lee, Suwon-si (KR); Chan Woong Jeon, Incheon (KR); Chulhee Heo, Hwaseong-si (KR); ChangHak Kang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 344 days.

(21) Appl. No.: 17/976,411

(22) Filed: Oct. 28, 2022

(65) Prior Publication Data

US 2023/0211830 A1    Jul. 6, 2023

(30) Foreign Application Priority Data

Jan. 6, 2022  (KR) .......................... 10-2022-0002096

(51) Int. Cl.
| | |
|---|---|
| *B62D 25/08* | (2006.01) |
| *B62D 25/10* | (2006.01) |
| *B62D 25/20* | (2006.01) |
| *B62D 27/02* | (2006.01) |

(52) U.S. Cl.
CPC .......... *B62D 25/105* (2013.01); *B62D 25/08* (2013.01); *B62D 25/2027* (2013.01); *B62D 27/02* (2013.01); *B62D 27/023* (2013.01)

(58) Field of Classification Search
CPC .... B62D 25/04; B62D 25/08; B62D 25/2027; B62D 27/023
USPC .................. 296/203.01, 4, 29, 30, 193.03, 8
See application file for complete search history.

(56) References Cited

U.S. PATENT DOCUMENTS

| | | | | |
|---|---|---|---|---|
| 4,887,859 A | * | 12/1989 | Aper | .................... B62D 47/006 296/193.03 |
| 6,102,470 A | * | 8/2000 | Heim | .................... B62D 25/087 293/133 |
| 6,846,037 B2 | * | 1/2005 | Engels | ................. B62D 25/087 296/187.11 |
| 8,801,084 B2 | * | 8/2014 | Gonin | ..................... B60J 5/101 296/187.11 |

FOREIGN PATENT DOCUMENTS

| | | | |
|---|---|---|---|
| CN | 112849270 A | * | 5/2021 |
| JP | 2000168632 A | * | 6/2000 |

* cited by examiner

*Primary Examiner* — Dennis H Pedder
(74) *Attorney, Agent, or Firm* — Slater Matsil, LLP

(57) ABSTRACT

An embodiment is a vehicle body rear connection structure including a chassis frame, a rear vehicle body assembly with a rear mounting portion connected to the chassis frame, and a rear end module assembled with the rear vehicle body assembly in a length direction of the vehicle body and the rear end module with an end module mounting portion connected with the rear mounting portion, the rear end module including a rear protruded portion configured to provide bolting engagement with the rear vehicle body assembly in a vertical direction of the vehicle body, and a forward protruded portion configured to be bolted to the rear vehicle body assembly in the vehicle body length direction.

20 Claims, 9 Drawing Sheets

VEHICLE BODY REAR CONNECTION STRUCTURE

CROSS-REFERENCE TO RELATED APPLICATIONS

This application claims priority to and the benefit of Korean Patent Application No. 10-2022-0002096 filed in the Korean Intellectual Property Office on Jan. 6, 2022, which application is incorporated herein by reference.

TECHNICAL FIELD

The present invention relates to a vehicle body rear connection structure.

BACKGROUND

In general, the frame of the vehicle body and the rear part of the life module are joined in a single direction of the vehicle body vertical direction of the floor member and the frame.

The floor member of the vehicle body is joined with the parts of the rear opening, and the rear body coupling part adds reinforcement inside the vehicle body floor member to ensure mounting strength.

The reinforcement may secure strength with a closed cross-section structure, but the reinforcement is within the closed cross-section of the floor member, so direct mechanical connection with the frame is not possible, so there is a limit to strength reinforcement.

The above information disclosed in this background section is only for enhancement of understanding of the background of the invention, and therefore it may contain information that does not form the prior art that is already known to a person of ordinary skill in the art.

SUMMARY

The present invention relates to a vehicle body rear connection structure. More particularly, the present invention relates to a vehicle body rear connection structure capable of firmly connecting a life module and a chassis frame of the vehicle body.

The present invention has been made in an effort to provide a vehicle body rear connection structure that may firmly connecting the life module of the vehicle body and the chassis frame.

A vehicle body rear connection structure according to an exemplary embodiment of the present invention may include a chassis frame, a rear vehicle body assembly formed with a rear mounting portion connected to the chassis frame, and a rear end module assembled with the rear vehicle body assembly in the length direction of the vehicle body and the rear end module formed with an end module mounting portion connected with the rear mounting portion.

The rear vehicle body assembly may include a quarter outer panel of which a quarter frame mounting portion is formed thereto, an inner back panel connected with the quarter outer panel and of which an inner mounting portion forms a first mounting space together with the quarter frame mounting portion is formed thereto, and an outer back panel connected with the inner back panel and of which an outer mounting portion forms a second mounting space together with the inner mounting portion is formed thereto.

The quarter frame mounting portion may be formed protrude to the lower portion of the vehicle body, and the outer mounting portion may be formed protrude to the upper portion of the vehicle body.

The quarter frame mounting portion and the inner mounting portion may be bolted to the chassis frame in the vehicle body vertical direction.

The end module mounting portion may include a rear protruded portion protruded adjacent to the first mounting space and the second mounting space for bolting engagement with the rear vehicle body assembly in a vehicle body vertical direction.

The rear end module may further include an end module rib formed adjacent to the rear protruded portion.

The quarter outer panel, the inner back panel and the outer back panel may be bent in the vehicle body vertical direction in the quarter frame mounting portion, the inner mounting portion and the outer mounting portion to form a front assembly mounting portion.

The rear end module may further include a forward protruded portion engaged with the front assembly mounting portion.

The front assembly mounting portion may be curved in the vehicle body inner direction.

The front assembly mounting portion and the forward protruded portion may be bolted to the vehicle body length direction.

The rear end module may include a rear protruded portion protruded for bolting engagement with the rear vehicle body assembly in the vertical direction of the vehicle body, and a forward protruded portion formed to be bolted to the rear vehicle body assembly in the vehicle body length direction.

The rear mounting portion and the chassis frame may be bolted to the vehicle body vertical direction.

The rear end module may be a closed shape that surrounds the rear vehicle body assembly.

According to the vehicle body rear connection structure according to an exemplary embodiment of the present invention, it is possible to firmly combine the life module and the chassis frame of the vehicle body.

According to the vehicle body rear connection structure according to an exemplary embodiment of the present invention, it is possible to secure the coupling strength by double coupling the life module and the chassis frame of the vehicle body.

In addition, for the effects that can be obtained or predicted due to an exemplary embodiment of the present invention, it is to be disclosed directly or implicitly in the detailed description of an exemplary embodiment of the present invention. That is, various effects predicted according to an exemplary embodiment of the present invention will be disclosed within a detailed description to be described later.

BRIEF DESCRIPTION OF THE DRAWINGS

Since these drawings are for reference in explaining an exemplary embodiment of the present invention, the technical idea of the present invention should not be construed as being limited to the accompanying drawings.

DETAILED DESCRIPTION OF ILLUSTRATIVE EMBODIMENTS

Figure 1:
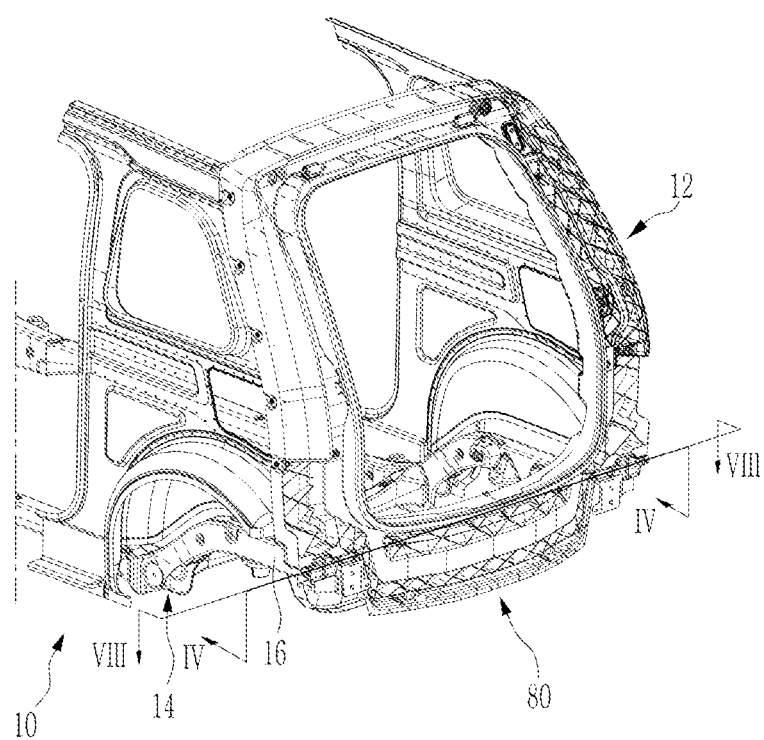
FIG. 1 is a partial perspective view of a vehicle body in which a vehicle body rear connection structure according to an exemplary embodiment of the present invention may be applied.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In order to clearly explain the present invention, parts irrelevant to the description are omitted, and the same reference numerals are assigned to the same or similar elements throughout the specification.

Since the size and thickness of each component shown in the drawing are arbitrarily indicated for convenience of explanation, the present invention is not necessarily limited to the one shown in the drawing, and the thickness is enlarged to clearly express various parts and areas.

In addition, in the following detailed description, the names of the components are divided into first, second, etc., in order to classify the components in the same relationship, and the order is not necessarily limited in the following description.

Throughout the specification, when it is said that a certain part includes certain constituent elements, this means that other constituent elements may be further included, rather than excluding other constituent elements, unless specifically stated otherwise.

In addition, terms such as part or means described in the specification mean a unit of a comprehensive configuration that performs at least one function or operation.

When a part, such as a layer, film, region, plate, etc., is "on" another part, this includes not only the case where it is directly above the other part, but also the case where there is another part in between.

In contrast, when an element is referred to as being "directly on" another element, there are no intervening elements present.

An exemplary embodiment of the present invention will hereinafter be described in detail with reference to the accompanying drawings.

Figure 2:
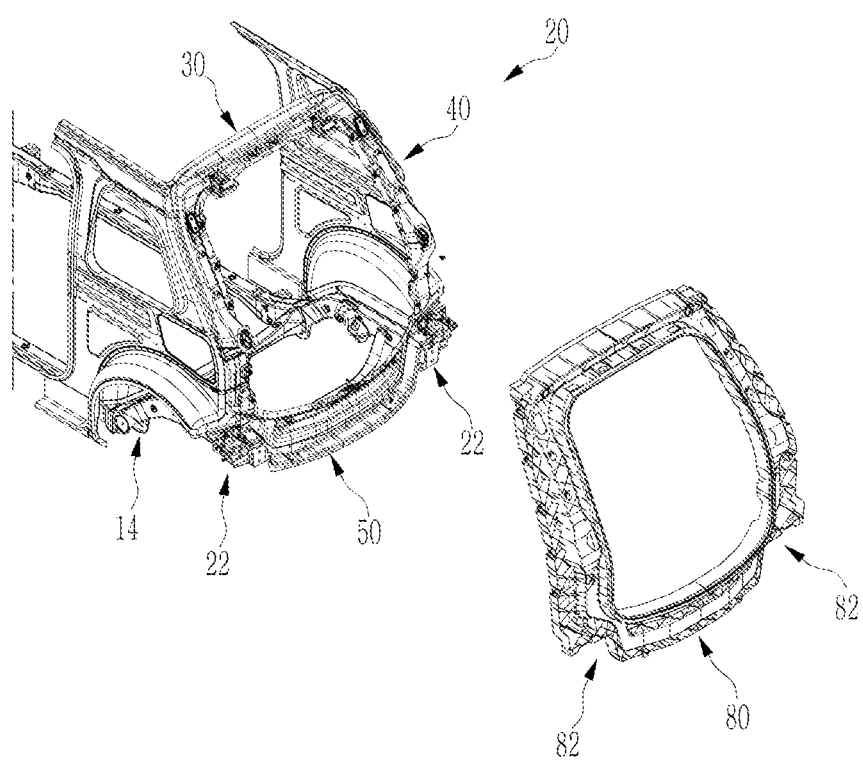
FIG. 2 is a partially exploded perspective view of a vehicle body in which a vehicle body rear connection structure according to an exemplary embodiment of the present invention may be applied.
Figure 3:
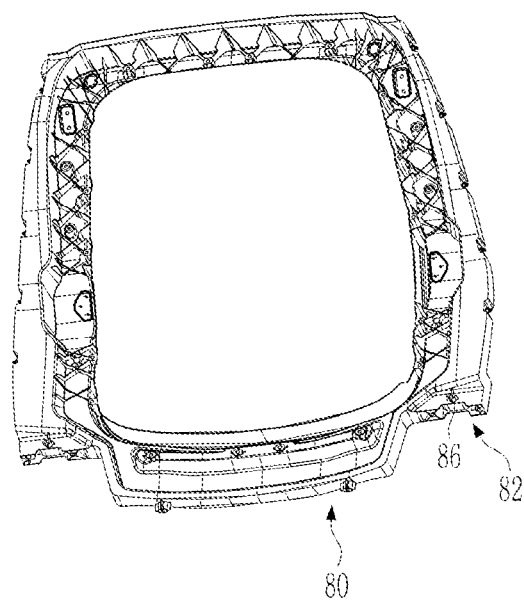
FIG. 3 is a perspective view of a rear end module applicable to the vehicle body rear connection structure according to an exemplary embodiment of the present invention.

FIG. 1 is a partial perspective view of a vehicle body in which a vehicle body rear connection structure according to an exemplary embodiment of the present invention may be applied, FIG. 2 is a partially exploded perspective view of a vehicle body in which a vehicle body rear connection structure according to an exemplary embodiment of the present invention may be applied, and FIG. 3 is a perspective view of a rear end module applicable to the vehicle body rear connection structure according to an exemplary embodiment of the present invention.

Referring to FIG. 1 to FIG. 3, a vehicle body 10 in which a vehicle body rear connection structure according to an exemplary embodiment of the present invention may be applied, may include a life module 12 and a chassis frame 14.

The chassis frame 14 may include a side frame 16 disposed along the length direction of the vehicle body 10, and a front suspension, a rear suspension, a battery module, a drivetrain, etc. may be mounted on the chassis frame 14.

The vehicle body rear connection structure according to an exemplary embodiment of the present invention may include the chassis frame 14, a rear vehicle body assembly 20 formed with a rear mounting portion 22 connected to the chassis frame 14, and a rear end module 80 assembled with the rear vehicle body assembly 20 in the length direction of the vehicle body and the rear end module 80 formed with an end module mounting portion 82 connected with the rear mounting portion 22.

The life module 12 may include the rear vehicle body assembly 20 and the rear end module 80.

The rear vehicle body assembly 20 may include a roof rail 30, a rear quarter 40 connected to both ends of the roof rail 30, and a back panel 50 connecting the both rear quarters 40.

The rear vehicle body assembly 20 may form a vehicle body rear structure of a closed shape by combining the roof rail 30, the rear quarters 40 and the back panel 50.

However, the present invention is not limited thereto, and may be applied to a structure in which a part is open.

The parts forming the rear vehicle body assembly 20 may be joined by welding as a metal material.

However, in the vehicle body rear connection structure according to an exemplary embodiment of the present invention, it is not limited thereto, and some constructions may be formed of non-metal materials, such as carbon fiber reinforced plastics (CFRP).

The rear end module 80 may have a closed shape surrounding the rear vehicle body assembly 20.

As shown in the drawing, the rear end module 80 may be formed in a closed shape completely enclosing the rear vehicle body assembly 20, but is not limited thereto, and the rear end module 80 with an open shape in some configurations is also applicable.

In addition, the rear end module 80 connected with the rear vehicle body assembly 20 may be injection molded.

The rear end module 80 may be formed as parts constituting the design of the vehicle, and by molding into an integral annular structure through injection, the number of parts may be reduced and the manufacturing process may be simplified.

In addition, by applying the rear vehicle body assembly 20 to the same vehicle type, and connecting the rear end module 80 with various designs to the rear vehicle body assembly 20, it is possible to easily diversify the design of the vehicle.

In addition, the rear end module 80 may be applied to various vehicle types to lower the overall production cost.

Figure 4:
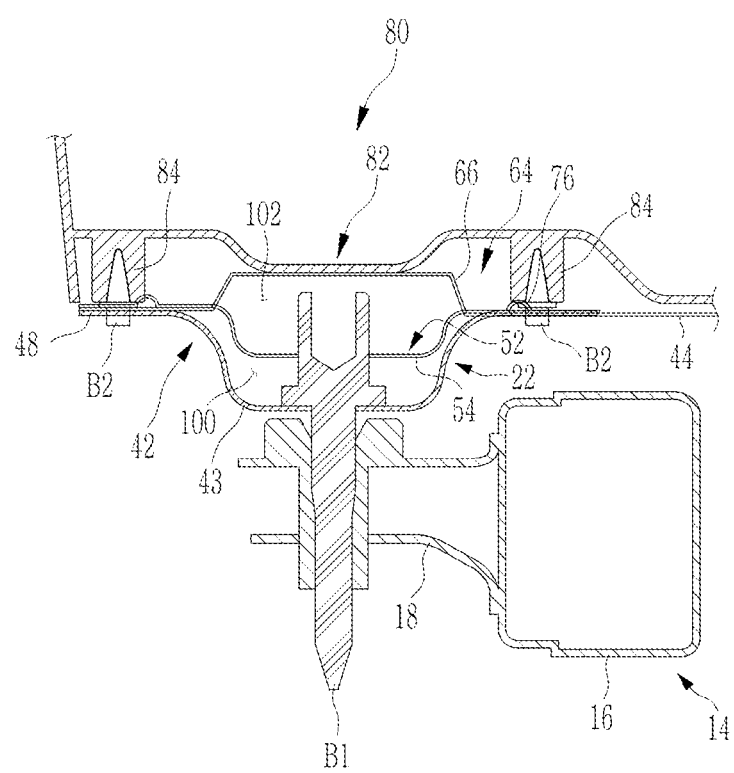
FIG. 4 is a cross-sectional view along the IV-IV line in FIG. 1.

FIG. 4 is a cross-sectional view along the IV-IV line in FIG. 1, and FIG. 5 to FIG. 7 is a partial perspective view of the vehicle body rear connection structure according to an exemplary embodiment of the present invention.

Referring to FIG. 1 to FIG. 7, the rear vehicle body assembly 20 may include a quarter outer panel 42 of which a quarter frame mounting portion 43 is formed thereto, an inner back panel 52 connected with the quarter outer panel 42 and of which an inner mounting portion 54 forms a first mounting space 100 together with the quarter frame mounting portion 43 is formed thereto, and an outer back panel 64 connected with the inner back panel 52 and of which an outer mounting portion 66 forms a second mounting space 102 together with the inner mounting portion 54 is formed thereto.

The quarter outer panel 42 may form the rear quarter 40 together with a quarter inner panel 41 disposed in the vehicle body vertical direction, and the inner back panel 52 and the outer back panel 64 may form the back panel 50.

That is, the rear mounting portion 22 may include a configuration of a coupling portion of the rear quarter 40 and the back panel 50.

The first mounting space 100 and the second mounting space 102 may form a double closed space to increase the strength of the mounting portion.

The quarter frame mounting portion 43 may be formed protrude to the lower portion of the vehicle body, and the outer mounting portion 66 may be formed protrude to the upper portion of the vehicle body.

The cross-section coefficient may be increased by the protrude shape of the quarter frame mounting portion 43 and the outer mounting portion 66 to increase the strength of the mounting portion.

The quarter frame mounting portion 43 and the inner mounting portion 54 may be bolted to the chassis frame 14 in the vehicle body vertical direction.

The vehicle body rear connection structure according to an exemplary embodiment of the present invention may further include a chassis frame bracket 18 that is mounted to the chassis frame 14 and connects the rear vehicle body assembly 20 and the chassis frame 14.

The chassis frame bracket 18 may be mounted on the side frame 16 to connect the rear vehicle body assembly 20 and the chassis frame 14.

That is, the quarter frame mounting portion 43 and the inner mounting portion 54 may be connected with the chassis frame bracket 18 in the vertical direction via bolt B1.

The end module mounting portion 82 may include a rear protruded portion 84 protruded adjacent to the first mounting space 100 and the second mounting space 102 for bolting engagement with the rear vehicle body assembly 20 in a vehicle body vertical direction.

That is, the rear end module 80, the outer back panel 64, the inner back panel 52 and the quarter outer panel 42 are connected through bolt B2, and the inner back panel 52, the quarter outer panel 42 and the chassis frame bracket 18 are connected through the bolt B1.

Therefore, it is possible to firmly assemble the life module 12 and the chassis frame 14 without additional reinforcement.

Figure 8:
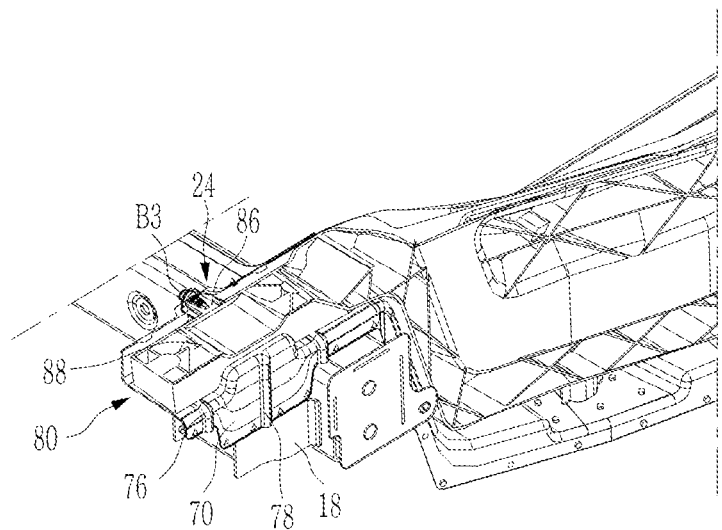
Figure 9:
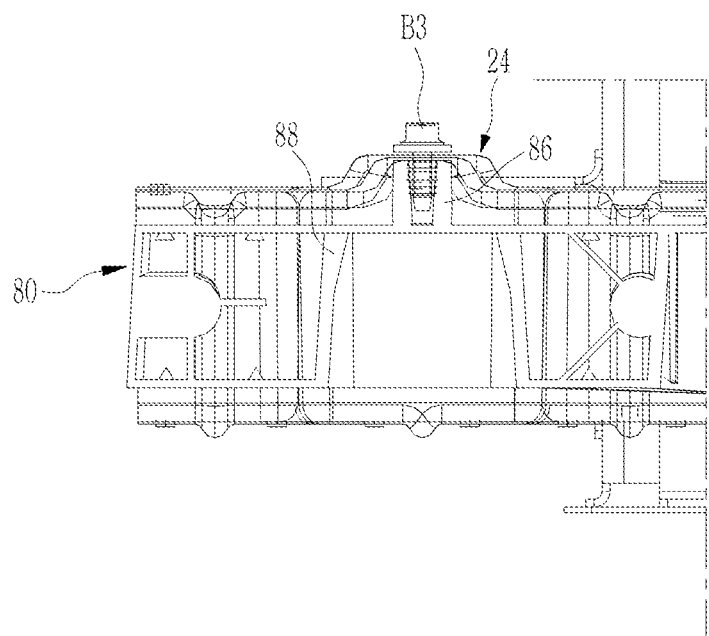
FIG. 9 is a cross-section perspective view and a cross-sectional view along the line VIII-VIII of FIG. 1.

FIG. 8 and FIG. 9 is a cross-section perspective view and a cross-sectional view along the line VIII-VIII of FIG. 1.

Referring to FIG. 5 to FIG. 9, the quarter outer panel 42, the inner back panel 52 and the outer back panel 64 are bent in the vehicle body vertical direction in the quarter frame mounting portion 43, the inner mounting portion 54 and the outer mounting portion 66 to form a front assembly mounting portion 24.

Figure 5:
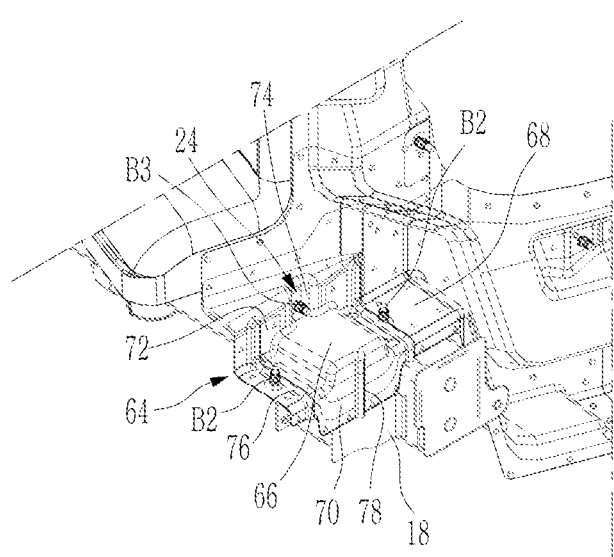
FIG. 5 to FIG. 7 is a partial perspective view of the vehicle body rear connection structure according to an exemplary embodiment of the present invention; and FIG. 8

Referring to FIG. 5, the outer back panel 64 may include an outer horizontal plate 68 curved from the outer mounting portion 66, an outer vertical plate 72, which is curved from the outer horizontal plate 68, and an outer reinforcement 74 adjoining the outer mounting portion 66 and the outer vertical plate 72 and protrude inside therein.

In addition, the outer back panel 64 may further include an outer back panel flange 70 curved from the outer mounting portion 66.

The outer back panel flange 70 may increase the strength of the outer back panel 64.

The outer back panel 64 may further include a back panel side bead 76 formed protrude from the front assembly mounting portion 24 adjacent the outer mounting portion 66.

The outer back panel 64 may further include a back panel center bead 78 protrude from the outer mounting portion 66 in the vehicle body vertical direction.

The back panel side bead 76 and the back panel center bead 78 may increase the strength of the outer back panel 64, and it is possible to distribute the collision load in the event of a rear impact of the vehicle.

Figure 6:
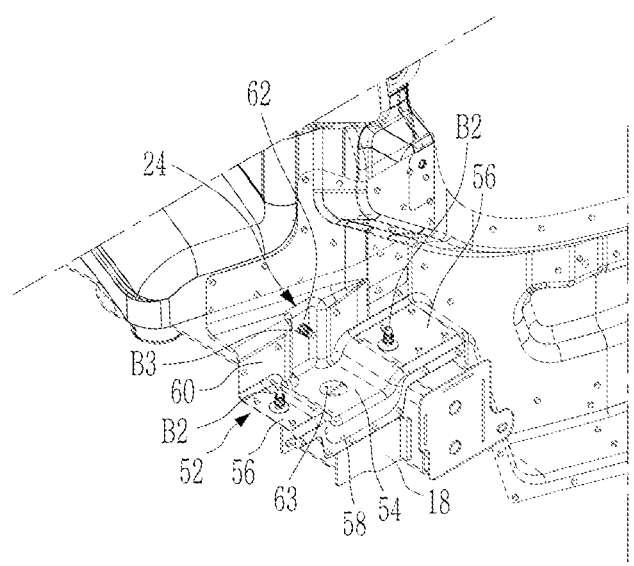

Referring to FIG. 6, the inner back panel 52 may include an inner horizontal plate 56 bent from the inner mounting portion 54 formed with a bolt hole 63, an inner vertical plate 60, which is curved from the inner horizontal plate 56, and an inner reinforcement 62 formed protrude inside the inner mounting portion 54 and the inner vertical plate 60

The inner back panel 52 may further include an inner back panel flange 58 curved from the inner mounting portion 54.

The inner back panel flange 58 may increase the strength of the inner back panel 52.

Figure 7:
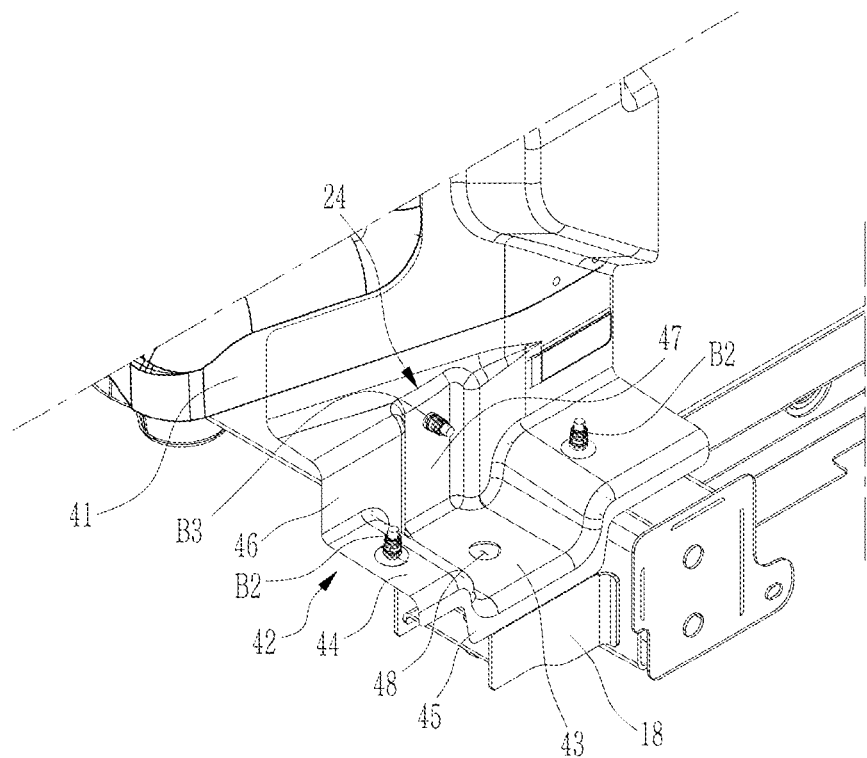

Referring to FIG. 7, the quarter outer panel 42 may include a quarter outer horizontal plate 44 bent from the quarter frame mounting portion 43 formed with a bolt hole 48, a quarter frame vertical plate 46, which is curved from the quarter outer horizontal plate 44, and a quarter reinforcement 47 adjoining the quarter frame mounting portion 43 and the quarter frame vertical plate 46, and protruding inside therein.

The quarter outer panel 42 may further include a quarter outer flange 45 curved from the quarter frame mounting portion 43.

The quarter outer flange 45 may increase the strength of the quarter outer panel 42.

The front assembly mounting portion 24 is curved in the vehicle body inner direction, and the outer reinforcement 74, the inner reinforcement 62 and the quarter reinforcement 47 form the front assembly mounting portion 24, increasing the strength of the front assembly mounting portion 24.

Referring to FIG. 3, FIG. 8 and FIG. 9, the end module mounting portion 82 may further include a forward protruded portion 86 engaged with the front assembly mounting portion 24.

The forward protruded portion 86 may be inserted into the front assembly mounting portion 24 to mount the rear end module 80 more securely.

The front assembly mounting portion 24 and the forward protruded portion 86 may be bolted together in the vehicle body length direction.

That is, a bolt B3 may connect the quarter outer panel 42, the inner back panel 52 and the outer back panel 64 and the rear end module 80.

The rear end module 80 may further include an end module rib 88 formed adjacent to the rear protruded portion 84.

The end module rib 88 may increase the strength of the rear protruded portion 84 and its surrounding portions.

As described above, the rear end module 80 includes the rear protruded portion 84 protruded for bolting engagement with the rear vehicle body assembly 20 in the vertical direction of the vehicle body, and the forward protruded portion 86 formed to be bolted to the rear vehicle body assembly 20 in the vehicle body length direction.

That is, the rear end module 80 forms a two-direction connection structure in which the rear end module 80 is bolted to the rear vehicle body assembly 20 in the vehicle body vertical direction through the bolt B2 and in the vehicle body length direction through the bolt B3.

In addition, the rear mounting portion 22 and the chassis frame 14 are bolted together with the bolt B1 in the vehicle body vertical direction, and the life module 12 and the chassis frame 14 may be firmly connected without a separate reinforcing member.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

| | |
|---|---|
| 10: vehicle body | 12: life module |
| 14: chassis frame | 16: side frame |
| 18: chassis frame bracket | 20: rear vehicle body assembly |
| 22: rear mounting portion | |
| 24: front assembly mounting portion | |
| 30: roof rail | 40: rear quarter |
| 41: quarter inner panel | 42: quarter outer panel |
| 43: quarter frame mounting portion | 44: quarter outer horizontal plate |
| 45: quarter outer flange | 46: quarter frame vertical plate |
| 47: quarter reinforcement | 50: back panel |
| 52: inner back panel | 54: inner mounting portion |
| 56: inner horizontal plate | 58: inner back panel flange |
| 60: inner vertical plate | 62: inner reinforcement |
| 63: bolt hole | 64: outer back panel |
| 66: outer mounting portion | 68: outer horizontal plate |
| 70: outer back panel flange | 72: outer vertical plate |
| 74: outer reinforcement | 76: back panel side bead |
| 78: back panel center bead | 80: rear end module |
| 82: end module mounting portion | 84: rear protruded portion |
| 86: forward protruded portion | 88: end module rib |
| 100: first mounting space | 102: second mounting space |

What is claimed is:

1. A vehicle body rear connection structure comprising:
a chassis frame;
a rear vehicle body assembly with a rear mounting portion connected to the chassis frame, wherein the rear vehicle body assembly comprises:
 a quarter outer panel comprising a quarter frame mounting portion;
 an inner back panel connected with the quarter outer panel and of which an inner mounting portion forms a first mounting space together with the quarter frame mounting portion; and
 an outer back panel connected with the inner back panel and of which an outer mounting portion forms a second mounting space together with the inner mounting portion; and
a rear end module assembled with the rear vehicle body assembly in a length direction of a vehicle body and the rear end module with an end module mounting portion connected with the rear mounting portion.

2. The vehicle body rear connection structure of claim 1, wherein the quarter frame mounting portion protrudes to a lower portion of the vehicle body, and the outer mounting portion protrudes to an upper portion of the vehicle body.

3. The vehicle body rear connection structure of claim 1, wherein the quarter frame mounting portion and the inner mounting portion are bolted to the chassis frame in a vehicle body vertical direction.

4. The vehicle body rear connection structure of claim 1, wherein the end module mounting portion comprises:
a rear protruded portion protruding adjacent to the first mounting space and the second mounting space for bolting engagement with the rear vehicle body assembly in a vehicle body vertical direction.

5. The vehicle body rear connection structure of claim 4, wherein the rear end module further comprises an end module rib adjacent to the rear protruded portion.

6. The vehicle body rear connection structure of claim 1, wherein the quarter outer panel, the inner back panel and the outer back panel are bent in a vehicle body vertical direction in the quarter frame mounting portion, the inner mounting portion and the outer mounting portion to form a front assembly mounting portion.

7. The vehicle body rear connection structure of claim 6, wherein the rear end module further comprises a forward protruded portion engaged with the front assembly mounting portion.

8. The vehicle body rear connection structure of claim 7, wherein the front assembly mounting portion is curved in a vehicle body inner direction.

9. The vehicle body rear connection structure of claim 7, wherein the front assembly mounting portion and the forward protruded portion are bolted in the vehicle body length direction.

10. The vehicle body rear connection structure of claim 1, wherein the rear end module comprises:
a rear protruded portion protruded for bolting engagement with the rear vehicle body assembly in a vertical direction of the vehicle body; and
a forward protruded portion formed to be bolted to the rear vehicle body assembly in the vehicle body length direction.

11. The vehicle body rear connection structure of claim 10, wherein the rear mounting portion and the chassis frame are bolted in the vehicle body vertical direction.

12. The vehicle body rear connection structure of claim 1, wherein the rear end module is a closed shape that surrounds the rear vehicle body assembly.

13. A vehicle body rear connection structure comprising:
a chassis frame;
a rear vehicle body assembly with a rear mounting portion connected to the chassis frame; and
a rear end module assembled with the rear vehicle body assembly in a length direction of a vehicle body and the rear end module with an end module mounting portion connected with the rear mounting portion, the rear end module comprising:
 a rear protruded portion configured to provide bolting engagement with the rear vehicle body assembly in a vertical direction of the vehicle body; and
 a forward protruded portion configured to be bolted to the rear vehicle body assembly in the vehicle body length direction.

14. The vehicle body rear connection structure of claim 13, wherein the rear mounting portion and the chassis frame are bolted in the vehicle body vertical direction.

15. The vehicle body rear connection structure of claim 13, wherein the rear vehicle body assembly comprises:
a quarter outer panel comprising a quarter frame mounting portion;
an inner back panel connected with the quarter outer panel and of which an inner mounting portion forms a first mounting space together with the quarter frame mounting portion; and an outer back panel connected with the inner back panel and of which an outer mounting portion forms a second mounting space together with the inner mounting portion.

16. The vehicle body rear connection structure of claim 15, wherein the quarter outer panel, the inner back panel and the outer back panel are bent in the vehicle body vertical direction in the quarter frame mounting portion, the inner mounting portion and the outer mounting portion to form a front assembly mounting portion.

17. The vehicle body rear connection structure of claim 16, wherein the rear end module further comprises a forward protruded portion engaged with the front assembly mounting portion.

18. The vehicle body rear connection structure of claim 17, wherein the front assembly mounting portion is curved in a vehicle body inner direction.

19. A vehicle body rear connection structure comprising:
a chassis frame;
a rear vehicle body assembly with a rear mounting portion connected to the chassis frame; and
a rear end module assembled with the rear vehicle body assembly in a length direction of a vehicle body and the rear end module with an end module mounting portion connected with the rear mounting portion, wherein the rear end module is a closed shape that surrounds the rear vehicle body assembly.

20. The vehicle body rear connection structure of claim 19, wherein the rear end module comprises:
a rear protruded portion protruded for bolting engagement with the rear vehicle body assembly in a vertical direction of the vehicle body; and
a forward protruded portion formed to be bolted to the rear vehicle body assembly in the vehicle body length direction, wherein the rear mounting portion and the chassis frame are bolted to the vehicle body vertical direction.

* * * * *